(12) United States Patent
Parker

(10) Patent No.: US 7,123,749 B2
(45) Date of Patent: Oct. 17, 2006

(54) HEIGHT MEASUREMENT APPARATUS

(75) Inventor: David R Parker, Preston (GB)

(73) Assignee: Bae Systems plc, Hampshire (GB)

( * ) Notice: Subject to any disclaimer, the term of this patent is extended or adjusted under 35 U.S.C. 154(b) by 810 days.

(21) Appl. No.: 10/343,055

(22) PCT Filed: Jul. 24, 2001

(86) PCT No.: PCT/GB01/03299

§ 371 (c)(1),
(2), (4) Date: Jan. 28, 2003

(87) PCT Pub. No.: WO02/12830

PCT Pub. Date: Feb. 14, 2002

(65) Prior Publication Data
US 2003/0118213 A1 Jun. 26, 2003

(30) Foreign Application Priority Data
Aug. 7, 2000 (GB) .................. 0019399.5

(51) Int. Cl.
G06K 9/00 (2006.01)
G06K 9/32 (2006.01)
H04N 7/18 (2006.01)
G01C 21/00 (2006.01)
G01C 23/00 (2006.01)
G01C 21/28 (2006.01)

(52) U.S. Cl. .................. 382/106; 382/154; 382/294; 382/295; 382/296; 382/298; 348/117; 348/144; 340/973; 340/974; 340/977; 340/978; 701/4; 701/217; 701/225

(58) Field of Classification Search ................ 382/106, 382/154, 276, 278, 293–298, 103, 104, 107, 382/277, 289; 340/967, 973–978; 348/113, 348/116, 117, 144; 701/3, 4, 217, 225; 356/2, 356/3, 12
See application file for complete search history.

(56) References Cited

U.S. PATENT DOCUMENTS 4,695,959 A * 9/1987 Lees et al. .................. 701/225

(Continued)

FOREIGN PATENT DOCUMENTS

EP 0 604 252 11/1993

OTHER PUBLICATIONS

Sim, D.-G.; Jeong, S.-Y.; Park, R.-H.; Kim, R.-C.; Lee, S.U.; Kim, I.C., Navigation parameter estimation from sequential aerial images, Sep. 16-19, 1996, Image Processing, 1996. Proceedings., International Conference on, vol. 1, pp. 629-632 vol. 2.*

(Continued)

Primary Examiner—Bhavesr M. Mehta
Assistant Examiner—Anthony Mackowey
(74) Attorney, Agent, or Firm—Nixon & Vanderhye P.C.

(57) ABSTRACT

Apparatus and methods for enhancing the accuracy of height above ground measurements in which the registration error between successive images taken of the terrain over which an aircraft is flying is minimized, the earlier image having first been transformed according to measurements of the aircraft linear and angular velocities, the focal length and attitude of the image sensor, and an initial, coarse height estimate. By an iterative process, a more accurate height estimate is obtained.

9 Claims, 3 Drawing Sheets

U.S. PATENT DOCUMENTS

| | | | | |
|---|---|---|---|---|
| 4,802,757 | A | * | 2/1989 | Pleitner et al. ............... 356/2 |
| 4,980,762 | A | * | 12/1990 | Heeger et al. ............. 382/107 |
| 5,072,396 | A | * | 12/1991 | Fitzpatrick et al. ......... 701/217 |
| 5,247,356 | A | | 9/1993 | Ciampa |
| 5,257,209 | A | * | 10/1993 | Markandey .................... 701/1 |
| 5,309,522 | A | * | 5/1994 | Dye ........................... 382/154 |
| 5,606,627 | A | | 2/1997 | Kuo |
| 5,692,062 | A | * | 11/1997 | Lareau et al. ............... 382/107 |
| 5,844,602 | A | * | 12/1998 | Lareau et al. ............... 348/144 |
| 5,926,581 | A | | 7/1999 | Pritt |
| 5,963,664 | A | * | 10/1999 | Kumar et al. ............... 382/154 |
| 6,307,959 | B1 | * | 10/2001 | Mandelbaum et al. ...... 382/154 |
| 6,859,549 | B1 | * | 2/2005 | Oliensis ...................... 382/154 |

OTHER PUBLICATIONS

Dong-Gyu Sim; Rae-Hong Park; Rin-Chul Kim; Sang Uk Lee; Ihn-Cheol Kim, Integrated position estimation using aerial image sequences, Jan. 2002, Pattern Analysis and Machine Intelligence, IEEE Transactions on, vol. 24, Issue 1, pp. 1-18.*

Hanaizumi et al: "An Automated Method for Estimating Terrain Height from Spot Stereo Pair Images" Quantitative Remote Sensing for Science and Applications. Firenze, Jul. 10-14, 1995, International Geoscience and Remote Sensing Symposium, New York, IEEE, US, vol. 3, Jul. 10, 1995, pp. 2167-2169, XP000547215 ISBN: 0-7803-2568-0, p. 2167-p. 2169: figures 1-3.

Min S Kang et al: "Recovering an Elevation Map by Stereo Modeling of the Aerial Image Sequence" Optical Engineering, Soc. of Photo-Optical Instrumentation Engineers. Bellingham, US. vol. 33, No. 11, Nov. 1, 1994, pp. 3793-3802, XP000475122, ISSN: 0091-3286 p. 3793-p. 3802: figures 1,2.

Hiroshi Hanaizumi et al: "An Automatic Method for Terrain Height Estimation form Spot Stereo Pair Images Using Correlation Between Epipola Lines" Remote Sensing Science for the Nineties. Maryland, May 20-24, 1990, Proceedings of the International Geoscience and Remote Sensing Symposium. (IGARSS), New York, IEEE, US, vol. 3 SYMP. 10, May 20, 1990, pp. 1959-1962, XP000146692, p. 1959-p. 1962: figures 2-4.

Ostrowski J A et al: "Error Correction of Digital Elevation Models Produced by Automatic Matching Stereo Images" Remote Sensing: Economic Tool for the Nineties. Vancouver, Jul. 10-14, 1989, Proceedings of the International Geoscience and Remote Sensing Symposium. (IGARSS), New York, IEEE, US. vol. 2 SYMO. 12, Jul. 10, 1989, pp. 446-449, XP000139139. p. 446-p. 449.

* cited by examiner

HEIGHT MEASUREMENT APPARATUS

This application is the US national phase of international application PCT/GB01/03299 filed 24 Jul. 2001 which designated the U.S.

This invention relates to the enhancement of the accuracy of height above ground measurements, such as may be required by aircraft moving over terrain of varying altitude.

Whilst many conventional methods exist for accurately establishing the height of an aircraft above the ground, these are all active, in that they require the emission of electromagnetic radiation, which emissions can be detected and thus advertise the aircraft's presence. For example, precise estimates of aircraft height above terrain are usually provided by radar or laser altimeters; but both these technologies require the emission of electromagnetic energy by the aircraft and thus may compromise its presence. Other, passive altitude measurements are available, such as from the Global Positioning System (GPS), barometric measurements or an Inertial Navigation System (INS). However, all provide unacceptably low accuracy measurements, and which are relative to an abstract datum, rather than the local terrain.

Accordingly, in one aspect the invention provides apparatus for enhancing the accuracy of height above ground measurements comprising imaging sensor means for providing successive images of the terrain over which the apparatus is moved, storage means for storing at least temporarily two successive images, transformation means for transforming the earlier of said two successive images into a transformed image according to the linear and angular velocities of the apparatus, to the attitude of the imaging sensor means relative to the horizontal plane and to the focal length of the imaging sensor means, and to an estimated height above ground measurement, and means for comparing the transformed image with the latter of said two successive images and for estimating the registration error therebetween, means being provided for generating estimated height above ground measurements so as to reduce the registration error.

In a second aspect, the invention provides a method of enhancing the accuracy of height above ground measurements for an estimator moving over the ground, the method comprising:

a) sensing two successive images of the terrain over which the estimator is moving;

b) generating an approximate measurement of the height above ground;

c) transforming the earlier of said two successive images into a transformed image, according to the linear and angular velocities of the estimator, to the attitude relative to the horizontal plane and the focal length of the image sensing means, and to an estimated height above ground measurement;

d) comparing the transformed image with the later of said two successive images and estimating the registration error therebetween, and e) producing a second transformed image of the earlier of said two successive images according to a second estimated height above ground measurement in order to reduce said registration error.

Such arrangements enable highly precise estimation of an aircraft's height above the terrain, without any emission of electromagnetic radiation, that is a passive estimation system. The estimation is generated by combining precise knowledge of aircraft velocities, a coarse estimate of aircraft height and visual motion measurements made on successive images recorded by a forward-looking sensor.

Preferably the transformation, comparison and production steps are iterated until the registration error falls below a predetermined value representative of the desired accuracy of height above ground measurement.

The visual motion in the image sequence from an airborne sensor viewing the over-flown terrain is a strong function of the aircraft's velocity and height above the terrain. Given measurements of the visual motion in the image sequence and knowledge of aircraft attitude and velocity, it is possible to deduce aircraft height. Experimental results and theoretical studies indicate that estimates of aircraft height can be made using methods and apparatus in accordance with the invention with an accuracy of 1% or better.

Derivation of height from pseudo stereo is a well known technique in the field of photogrammetry [Thomas D. Williams. "Depth from camera motion in a real world scene." IEEE Transactions on Pattern Analysis and Machine Intelligence, 2(6):511–516, 1980]. Nonetheless, there are considerable problems in doing this completely automatically. Principal amongst these is the problem of reliably detecting and tracking interest points in the image sequence to make the accurate and reliable measurements of visual motion required for altitude estimation. This problem is referred to as the correspondence problem in the computer vision field.

The present invention does not rely on explicit correspondences between interest points in successive images. Instead, it uses knowledge of aircraft attitude and velocity, together with a coarse estimate of altitude to register two images from a sensor image sequence. A simple measure of the registration error is then made and standard iterative techniques, (for instance [Press, Teukolsky et al, "Numerical Recipes in C," dfpmin( ), Chapter 10, pp 425–430, Cambridge University Press, 1994.] [Numerical Algorithms Group (NAG) Library, Mark 16, Routine E04FCF( ) NAg Ltd, Oxford, United Kindom.]) are used to minimise this error measure by optimising the altitude estimate. Thus, assuming accurate knowledge of aircraft velocity and attitude, together with an adequate initial estimate of altitude, an accurate estimate of height can be made and the difficult correspondence problem; associated with more conventional and unreliable approaches avoided. The solution can be initialised with the height estimate from the last pair of images processed, or using information from GPS, barometric or inertial sensors.

The processing in steps c) to e) may be carried out on only some of the pixels constituting the two successive-images. This significantly reduces the processing requirement, enabling accurate height estimation to be derived more quickly. Additionally or alternatively, steps c) to e) may be carried out on only part, or parts, of the two successive images. This would enable variable terrain height to be better dealt with, and would permit useful estimation of terrain profile.

The invention will now be described by way of example and with reference to the accompanying drawings, in which.

Figure 1:
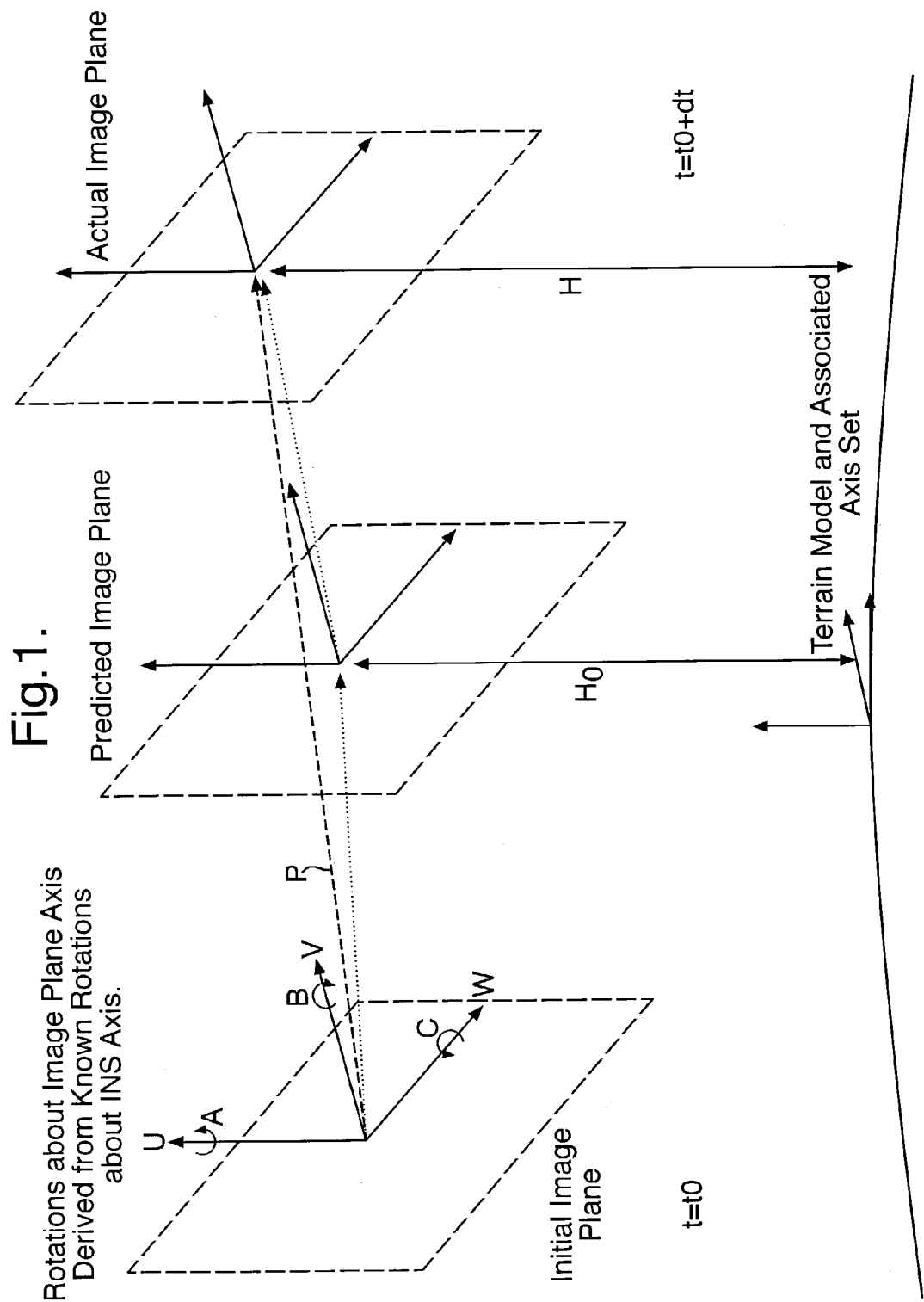
FIG. 1 is a schematic diagram of the image registration process forming part of the present invention.

Referring to FIG. 1, a camera is in motion along path P with a known linear velocity $\underline{V}_T=(U,V,W)$, angular velocity $\underline{A}=(A,B,C)$ and attitude $\underline{\theta}=(\theta,\phi,\psi)$ at an unknown altitude H above a terrain. An erroneous estimate of H, $H_O$ is available.

An image $I_t$ is captured at time t and subsequently, another image $It_{+\delta t}$ is captured at time t+δt. Given knowledge of $\underline{V}_T$, $\underline{A}$, $\underline{\theta}$ and the estimate $H_O$ it is possible to derive a transform T that when applied to $I_t$ forms a new image $I_t|_T$ that is coarsely registered with $I_{t+\delta t}$. The registration error between these two images is a function of the error in $H_O$.

For each pixel in $I_t$ that represents a terrain point, the transformation T to register it with the corresponding pixel in $I_{t+\delta t}$ is defined by the following procedure:

1. Determine the visual motion $\underline{\dot{x}}=(\dot{x}, \dot{y}, 0)$ at pixel $\underline{x}=(x,y)$ in $I_{t+\delta t}$ for the current values of $\underline{V}_T$, $\underline{A}$, $\underline{\theta}$, sensor focal length f and the estimate $H_O$ from the following expressions:

$$\begin{pmatrix} \dot{x} \\ \dot{y} \\ 0 \end{pmatrix} = \frac{1}{Z_i} \begin{pmatrix} -f & 0 & x \\ 0 & -f & y \\ 0 & 0 & 0 \end{pmatrix} \begin{pmatrix} U \\ V \\ W \end{pmatrix} - \begin{pmatrix} \frac{xy}{f} & \frac{x^2}{f}-f & y \\ \frac{y^2}{f}+f & \frac{-xy}{f} & -x \\ 0 & 0 & 0 \end{pmatrix} \begin{pmatrix} A \\ B \\ C \end{pmatrix} \quad (1)$$

where:

$$Z_i = \frac{Hf}{(-x_i \cos\theta \sin\phi + y_i \cos\theta \cos\phi + f \sin\theta)} \quad (2)$$

for situations in which the imaged scene can be modelled by a plane.

2. Given $\underline{\dot{x}}$, determine the source position in $I_t$ of pixel (x,y) in $I_{t+\delta t}$ from $\underline{x}-\underline{\dot{x}}$.
3. Interpolate from the four integer pixel positions surrounding $\underline{x}-\underline{\dot{x}}$ in $I_t$ to determine the pixel grey level value at (x,y) in $I_{t+\delta t}$.

The registration error between images $I_t|_T$ and $I_{t+\delta t}$ is quantified by the following expression, in which N is the number of pixels processed in the image:

$$\varepsilon = \sum_{i=1}^{N} (I_{t+\delta t_i} - I_t|_{T_i})^2 \quad (3)$$

The value of ε, referred to as the cost function, is minimised using an iterative procedure to choose the optimum value of H and hence provide an estimate of aircraft altitude. Standard numerical software procedures are available for this task and two such procedures: E04FCF( ) supplied by the Numerical Algorithms Group [Numerical Algorithms Group (NAG) Library, Mark 16, Routine E04FCF( ) NAg Ltd, Oxford, United Kindom.] and ddfpmin( ) taken from the textbook [Press, Teukolsky et al, "Numerical Recipes in C," dfpmin( ), Chapter 10, pp 425–430, Cambridge University Press, 1994.] have been used satisfactorily in this role. Other implementations of a Newton or Quasi Newton type optimisation procedure would probably also be acceptable in place of the two routines suggested.

For a visible light sensor, the noise corruption in the images can frequently be modelled by zero mean IID Gaussian random variables, (see [Glenn Healey and Raghava Kondepudy. "CCD Camera Calibration and Noise Estimation". In *Proceedings of the 1993 IEEE Computer Society Conference on Computer Vision and Pattern Recognition*, pp90–95, 1992. ] for further details). In this situation, minimising the expression at (3) above is the maximum likelihood estimator for this class of noise. This estimation procedure will thus give the most accurate results achievable by any estimator under the anticipated image noise conditions.

Figure 2:
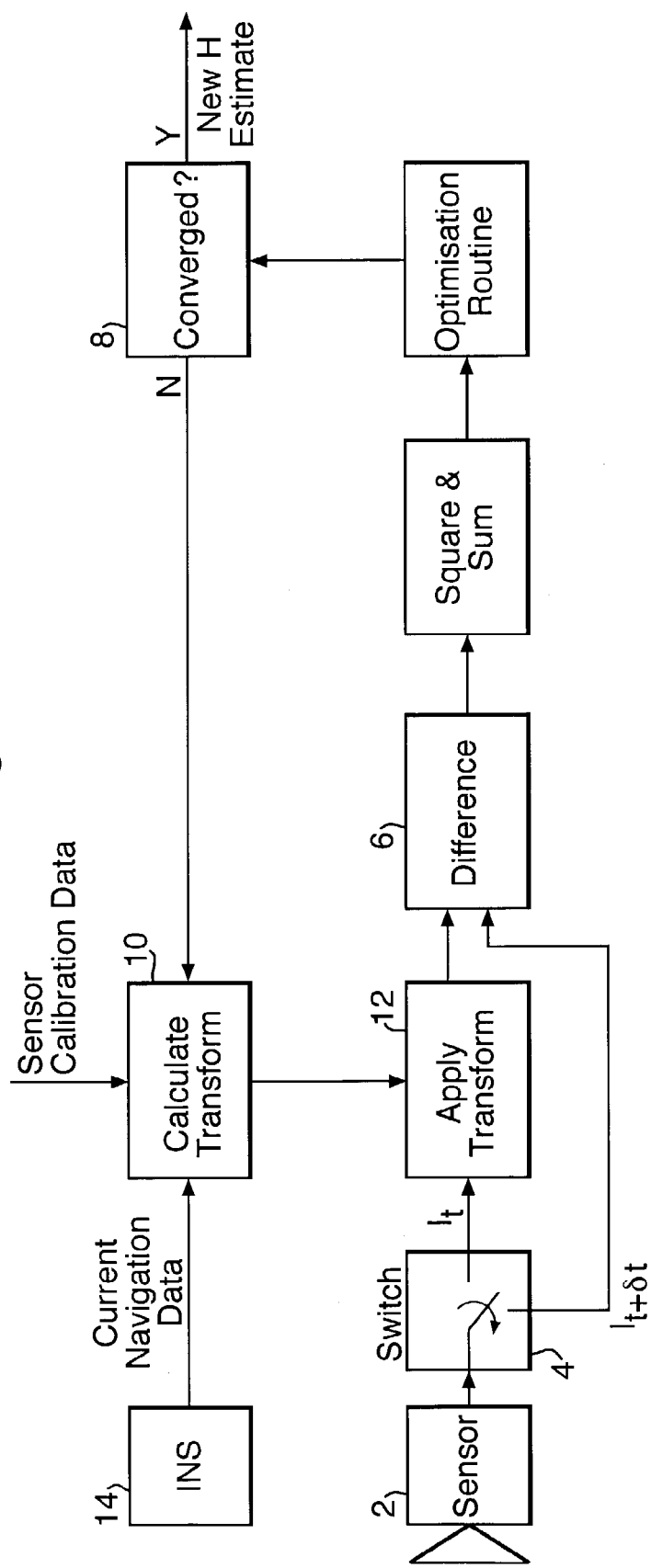
FIG. 2 is a schematic diagram showing the operation of an apparatus in accordance with the invention.

FIG. 2 illustrates the operation of an apparatus in accordance with the invention in which images $I_t$t and $I_{t+\delta t}$ are recorded by sensor, or camera 2. A storage/switching means 4 stores both images and passes the later image $I_{t+\delta t}$ to a comparator 6 for measuring the difference between the later image $I_{t+\delta t}$ and the transformed image $I_t|_T$, which difference is then processed to provide a registration error ε and passed to another comparator 8 which assesses whether the registration error ε has reduced to, or converged on, a predetermined value (which is indicative of the error in the height measurement); if there is convergence, the accurate height measurement H is recoverable, and if not the comparator 8 instructs the transformer 10 to calculate a new transformation according to a revised estimate of height above ground, which is then applied to the first image $I_t$ by transformation means 12, for comparison with the inter image $I_{t+\delta t}$ by comparator 6.

The inputs of instantaneous linear and angular velocity are made to the transformer 10 from an Inertial Navigation System 14, and sensor calibration data representative of the sensor attitude are also input to the transformer 10 to enable it to calculate the transformation at (1) and (2) above.

The accuracy of the altitude estimates made in accordance with the invention, given the numerical optimisation procedure chosen, is strongly influenced by the following factors:

1. The installation of the sensor to the platform, in particular the sensor "pitch down" angle with respect to the platform horizontal reference. This pitch angle should be made as large as possible whilst ensuring sufficient commonality between successive images for the image matching procedure to work.
2. The electronic noise introduced into the image sequence by the sensor. The noise in the altitude estimates is linearly related to the noise in the image sequence.
3. The sensor focal length. The larger the values of this parameter, the more accurate the altitude estimates.

Figure 3:
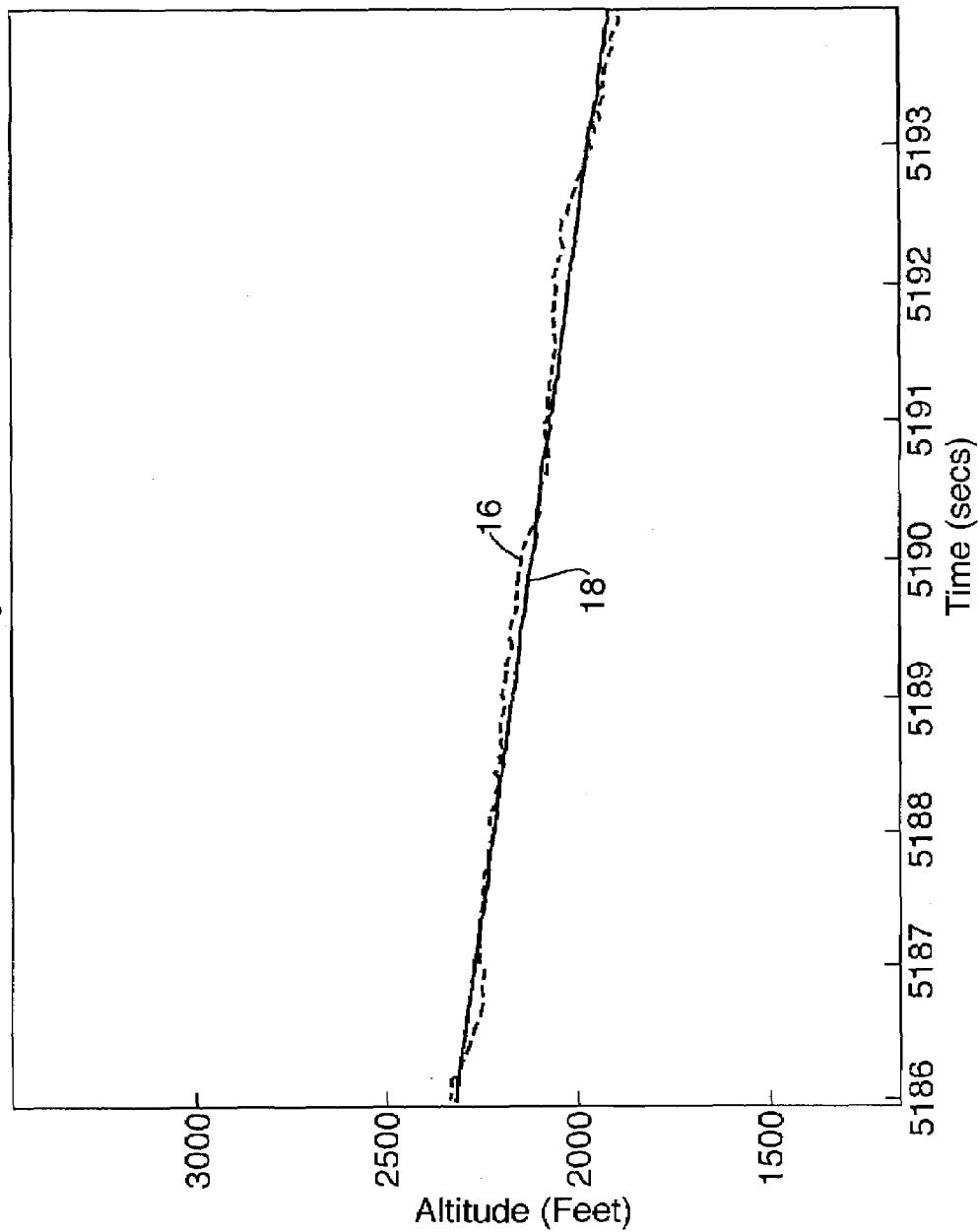
FIG. 3 is a comparison of heights estimated according to the invention with heights derived from radar altimeter data.

Theoretical studies, indicate that altitude can be estimated with an accuracy of better than 1%, given a suitable choice of sensor and sensor installation. Recent experimental results, an example of which is shown in FIG. 3, support this prediction for the accuracy with which altitude estimates can be made. In FIG. 3 the altitude estimates made using the invention are shown by a dashed line (16), together with the corresponding radar altimeter data (shown by a solid line (18) for comparison.

Having described the invention, certain advantageous modifications will be appreciated by those skilled in the art. For example 1. The invention as currently proposed processes all pixels in the image that represent ground regions and does not process any pixels corresponding to the sky. Two modifications to this crude method of choosing pixels for processing could be made:
    Select only "interesting" pixels in the image sequence for processing. This selection could be made on the basis of a number of criteria: for instance the local image edge strength, or the pixel's image position. Such a modification would significantly reduce the processing requirements of the invention.

Apply the matching procedure to small regions of the image, for instance a horizontal band at the bottom. This would produce estimates of altitude relative to small patches of terrain, rather than relative to all of the terrain in the sensor field of view. Hence, this modification would make the invention better able to deal with variable terrain height and would allow useful estimates of terrain profile to be made.

2. Given that suitable modifications are made to the proposed invention, as discussed above, the passive altimeter system could be used to generate inputs for a terrain referenced navigation system. Such a development, if successful, would provide a capability for entirely passive, autonomous, precision navigation.

From the foregoing description it will be apparent that there has been provided improved apparatus and methods for enhancing the accuracy of height above ground measurements. While the invention has been described in detail with particular reference to preferred embodiments thereof, it will be understood that variations and modifications can be effected within the spirit and scope of the invention. Accordingly the foregoing description should be taken as illustrative and not in a limiting sense.

The invention claimed is:

1. Apparatus for enhancing the accuracy of height above ground measurements comprising imaging sensor means for providing successive images of the terrain over which the apparatus is moved, storage means for storing at least temporarily two successive images, transformation means for transforming the earlier of said two successive images into a transformed image according to the linear and angular velocities of the apparatus, to the attitude of the imaging sensor means relative to the horizontal plane and to the focal length of the imaging sensor means, and to an estimated height above ground measurement, and means for comparing the transformed image with the latter of said two successive images and for estimating the registration error therebetween, means being provided for generating estimated height above ground measurements so as to reduce the registration error.

2. An autonomous navigation system for an airborne vehicle comprising apparatus according to claim 1 adapted to produce signals according to successive height above ground measurements of discrete areas within the field of view of the imaging sensor means, means responsive to the signals to provide an estimated profile of the terrain beneath the airborne vehicle, and means to compare the estimated terrain profile with a stored terrain and to estimate the airborne position therefrom.

3. A method of enhancing the accuracy of height above ground measurements for an estimator moving over the ground, the method comprising:

a) sensing two successive images of the terrain over which the estimator is moving;

b) generating an approximate measurement of the height above ground;

c) transforming the earlier of said two successive images into a transformed image, according to the linear and angular velocities of the estimator, to the attitude relative to the horizontal plane and the focal length of the image sensing means, and to an estimated height above ground measurement;

d) comparing the transformed image with the later of said two successive images and estimating the registration error therebetween, and e) producing a second transformed image of the earlier of said two successive images according to a second estimated height above ground measurement in order to reduce said registration error.

4. A method according to claim 3 comprising iterating steps c) to e) until the registration error falls below a predetermined value.

5. A method according to claim 3 wherein the approximate measurement of the height above ground is generated by an earlier application or iteration of steps c) to e) performed on two successive images previously sensed.

6. A method according to claim 3 wherein steps c) to e) are carried out on only some of the pixels constituting the two successive sensed images.

7. A method according to claim 3 wherein steps c) to e) are carried out on only part of the two successive sensed images.

8. A method according to claims 3 wherein the transformation of the earlier of two successive images, $I_t$ and $I_{t+\delta t}$, to form a transformed image $I_t|_T$ is effected by determining the visual motion $\dot{\underline{x}}=(\dot{x}, \dot{y},0)$ at pixel $x=(x,y)$ for the values of linear velocity $V_T=(U,V,W)$, angular velocity $A=(A,B,C)$, image sensing means attitude $\theta=(\theta,\phi,\psi)$ and focal length $f$, and height above ground $H$ (for which an erroneous or inaccurate value $H_O$ is available) according to the expression:

$$\begin{pmatrix} \dot{x} \\ \dot{y} \\ 0 \end{pmatrix} = \frac{1}{Z_i} \begin{pmatrix} -f & 0 & x \\ 0 & -f & y \\ 0 & 0 & 0 \end{pmatrix} \begin{pmatrix} U \\ V \\ W \end{pmatrix} - \begin{pmatrix} \frac{xy}{f} & \frac{x^2}{f}-f & y \\ \frac{y^2}{f}+f & \frac{-xy}{f} & -x \\ 0 & 0 & 0 \end{pmatrix} \begin{pmatrix} A \\ B \\ C \end{pmatrix}$$

where:

$$Z_i = \frac{Hf}{(-x_i \cos\theta \sin\phi + y_i \cos\theta \cos\phi + f \sin\theta)}$$

for situations in which the imaged scene can be modelled by a plane, determining the source position in $I_t$ of pixel $(x, y)$ in $I_{t+\delta t}$ from $\underline{x}-\dot{\underline{x}}$, and interpolating from the four integer pixel positions surrounding $\underline{x}-\dot{\underline{x}}$ in $I_t$ to determine the pixel grey level value at $(x, y)$ in $I_{t+\delta t}$.

9. A method according to claim 8 wherein the registration error between images $I_t|_T$ and $I_{t+\delta t}$ is quantified by the following expression, in which N is the number of pixels processed in the image:

$$\varepsilon = \sum_{i=1}^{N} (I_{t+\delta t_i} - I_t|_{T_i})^2.$$

* * * * *